United States Patent [19]
Watanabe et al.

[11] Patent Number: 5,385,217
[45] Date of Patent: Jan. 31, 1995

[54] VIBRATION ELIMINATING APPARATUS FOR ELMINATING VIBRATION OF AN INSTALLATION FLOOR

[75] Inventors: Katsuhide Watanabe; Yoichi Kanemitu, both of Kanagawa; Yukio Ikeda, Tokyo, all of Japan

[73] Assignee: Ebara Corporation, Tokyo, Japan

[21] Appl. No.: 885,451

[22] Filed: May 19, 1992

[30] Foreign Application Priority Data

May 20, 1991 [JP] Japan .................. 3-143904
Dec. 18, 1991 [JP] Japan .................. 3-353813

[51] Int. Cl.⁶ .................. F16F 15/03; B25H 1/02
[52] U.S. Cl. .................. 188/267; 248/550; 248/638; 318/649; 318/651
[58] Field of Search ............. 267/136; 188/267, 378; 248/550, 638; 318/623, 649, 651; 335/266, 272, 279

[56] References Cited

U.S. PATENT DOCUMENTS

| | | |
|---|---|---|
| 3,464,657 | 9/1969 | Bullard . |
| 4,093,931 | 6/1978 | Fenton .................. 335/279 X |
| 4,351,515 | 9/1982 | Yoshida . |
| 4,795,123 | 1/1989 | Forward et al. .................. 248/550 |
| 5,022,628 | 6/1991 | Johnson et al. . |

FOREIGN PATENT DOCUMENTS

| | | |
|---|---|---|
| 0338933 | 10/1989 | European Pat. Off. . |
| 2586462 | 2/1987 | France . |
| 2905973 | 8/1980 | Germany . |
| 230621 | 12/1985 | Germany . |
| 1-131354 | 5/1989 | Japan .................. 188/267 |
| 3-61746 | 3/1991 | Japan .................. 248/638 |

*Primary Examiner*—Robert J. Oberleitner
*Assistant Examiner*—Kevin D. Rutherford
*Attorney, Agent, or Firm*—Wenderoth, Lind & Ponack

[57] ABSTRACT

A vibration eliminating apparatus for eliminating vibration suspends a floor board from an installation floor. A supporting electromagnet is provided on the installation floor in order to suspend a magnetic member fixed to the floor board by a magnetic force. The magnetic member is provided with a thin magnetic pole through a non-magnetic member, and a control electromagnet having a yoke located in proximity to the thin magnetic pole is provided to control a horizontal position of the floor board. A vibration detector is provided to detect vibration of the floor board, and a vibration monitor is used to decide whether or not vibration detected by the vibration detector is within an allowable range of a machine mounted on the floor board and output an operation enable signal only when vibration is within the allowable range.

10 Claims, 8 Drawing Sheets

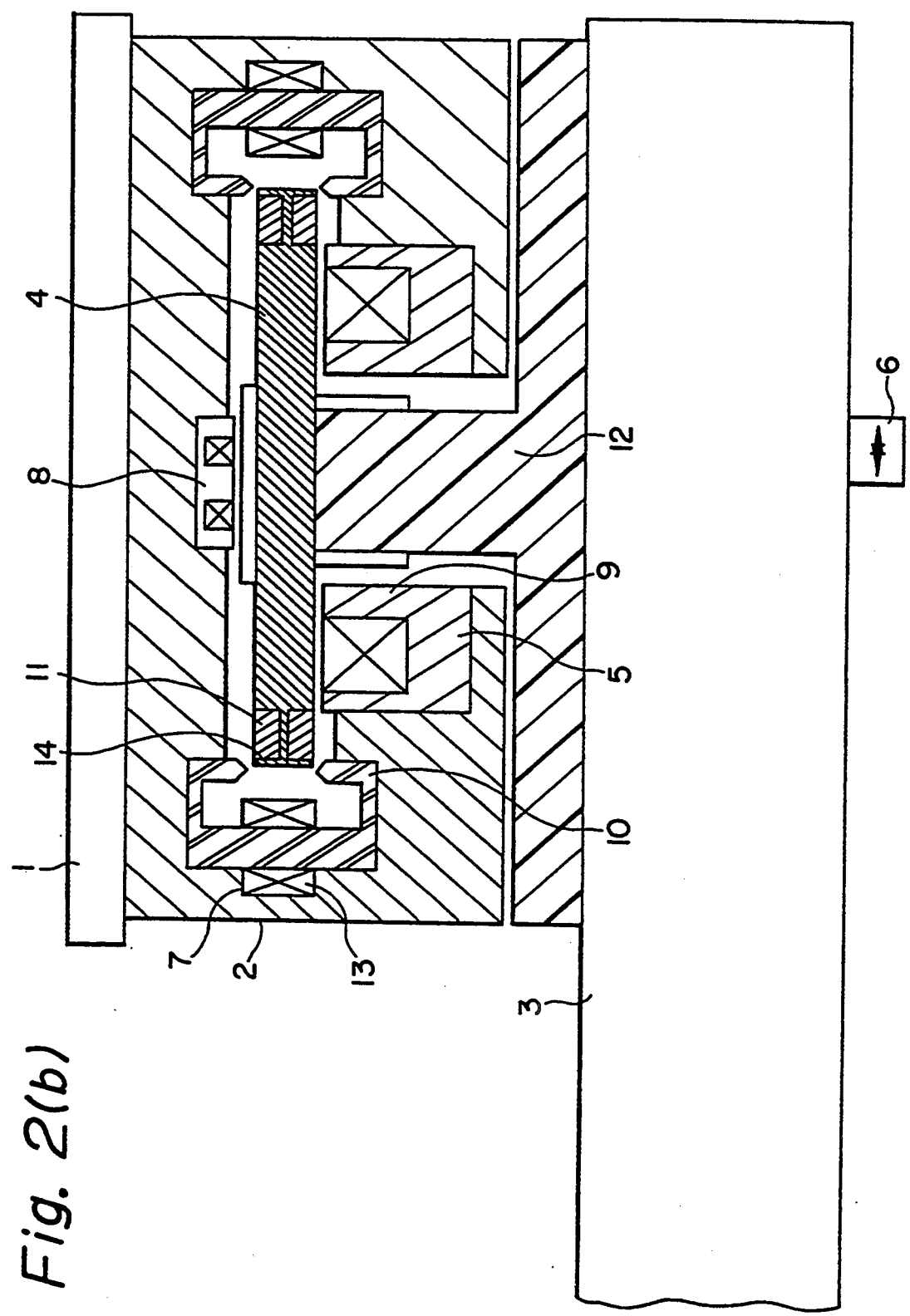

VIBRATION ELIMINATING APPARATUS FOR ELMINATING VIBRATION OF AN INSTALLATION FLOOR

BACKGROUND OF THE INVENTION

1. Field of the Invention

The present invention relates to a vibration eliminating apparatus for an apparatus such as a semiconductor manufacturing apparatus and an electron microscope, and particularly to a high precision vibration eliminating apparatus for shielding vibration from an installation floor and for controlling a vibration generating force produced by such an apparatus itself, which vibration and vibration generating force have adverse influences on the yield of a product and accuracy in measurement or observation.

2. Description of the Prior Art

A machine such as an electron microscope and a semiconductor manufacturing apparatus, which should be stable vibration, has been supported by a vibration eliminating apparatus. As an example of a conventional stably supported apparatus, a pneumatic spring or a vibration-proof rubber has been used. A machine such as an electron microscope and a semiconductor manufacturing apparatus has been mounted on a vibration eliminating floor board provided with pneumatic springs or vibration-proof rubber so that the vibration of an installation floor is absorbed by the pneumatic springs or the vibration-proof rubber to avoid the vibration of the floor from having any adverse influence on the yield of the product and the accuracy in measurement by shielding the vibration from the machine installed on the vibration eliminating floor board. However, since the vibration eliminating apparatuses using pneumatic springs or vibration-proof rubber are mechanical, it has been difficult for the vibration eliminating apparatus utilizing pneumatic springs and vibration-proof rubber to completely eliminate vibration, particularly small vibrations. Moreover, such a vibration eliminating apparatus cannot absorb large vibration exceeding the limit of the pneumatic spring and the vibration-proof rubber, and may sometimes have an impact on a machine such as the electron microscope, mounted on the floor board.

In addition, whether or not the vibration level (absolute value) is maintained within an allowable range as a result of the elimination of the vibration is not monitored. Consequently, if an apparatus operates when a vibration level exceeds an allowable range, an adverse influence is given to the yield of the product and the accuracy in measurement and observation.

SUMMARY OF THE INVENTION

The present invention has been proposed, taking the problems of the prior art into consideration. It is therefore an object of the present invention to provide a vibration eliminating apparatus for suspending a floor board from an installation floor. It is another object of the present invention to provide a vibration eliminating apparatus for eliminating small vibrations of an installation floor by detecting the acceleration of a floor board to eliminate the vibration thereof. It is a further object of the present invention to provide a vibration eliminating apparatus which monitors vibration of a floor board by a vibration detector provided in the floor board in order to decide whether the vibration level is within an allowable range of the machine mounted on the floor board so as to output an operation enabling signal when the vibration level is within the allowable range, thereby avoiding the vibrations having an adverse influence on the yield of the product and the accuracy in measurement and observation.

In order to achieve the above-mentioned objects of the present invention, according to one aspect of the present invention, a vibration eliminating apparatus of the present invention comprises a magnetic member fixed to a floor board and a supporting electromagnet fixed to an installation floor for suspending the magnetic member by magnetic force. The magnetic member fixed to the floor board is surrounded by a thin magnetic pole through a non-magnetic member. A control electromagnet is provided to exert a magnetic attracting force to the magnetic pole. The control electromagnet is controlled to eliminate vibration of the floor board by detecting the acceleration of the floor board.

The supporting electromagnet fixed on the installation floor, when an exciting current flows therethrough, attracts and suspends the magnetic member by a magnetic attracting force. Therefore, the floor board, fixed to the magnetic member, can be suspended from the installation floor. The magnetic member is surrounded by a thin magnetic pole through a non-magnetic member, and a control electromagnet having a yoke is disposed such that the yoke is in proximity to the thin magnetic pole. Therefore, the floor board can be free from the vibration of the installation floor, even if the vibration level is low, by exerting a magnetic attracting force on the thin magnetic pole from the yoke of the control electromagnet to cancel vibration by detecting acceleration of the floor board.

According to another aspect of the present invention, a vibration eliminating apparatus utilizes a spring action by suspending a floor board to eliminate small vibrations of an installation floor or a vibration generating force from a machine mounted on the floor board. A vibration detector is provided on the floor board to detect vibration of the floor board and a vibration monitor is also provided to monitor the vibration detected by the vibration detector and decide whether or not the vibration level is within an allowable range of the machine mounted on the floor board so as to output an operation enable signal only when the vibration level is within the allowable range.

According to the present invention, a vibration detector provided on a floor board detects vibration of the floor board. When a vibration level is within an allowable range, an operation enable signal is issued, and the machine is allowed to operate only when the operation enable signal is outputted. If the vibration level exceeds the allowable range, the operation enable signal is not outputted and the machine stops operation. Therefore, the machine operates depending On the existence of the operation enable signal and can operate under the condition that the vibration level is within the allowable range.

BRIEF DESCRIPTION OF THE DRAWINGS

FIG. 2(b) is a variation of the arrangement of the structure of the actuator of FIG. 2(a);

DETAILED DESCRIPTION OF THE PREFERRED EMBODIMENTS

Figure 1:
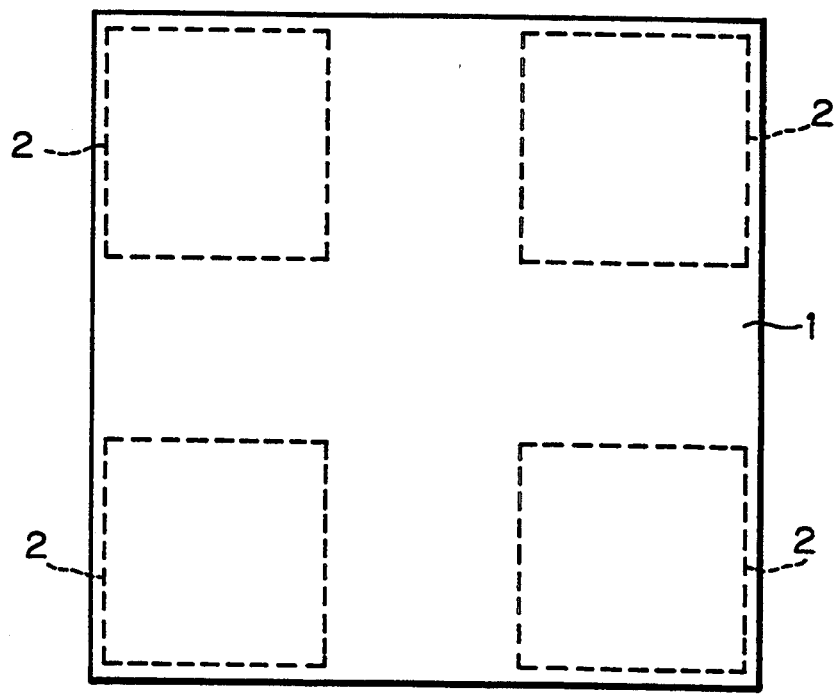
FIGS. 1(a) and 1(b) illustrate an embodiment of a vibration eliminating apparatus of the present invention, FIG. 1(a) being a plan view thereof and FIG. 1(b) being a side elevation thereof.
Figure 1:
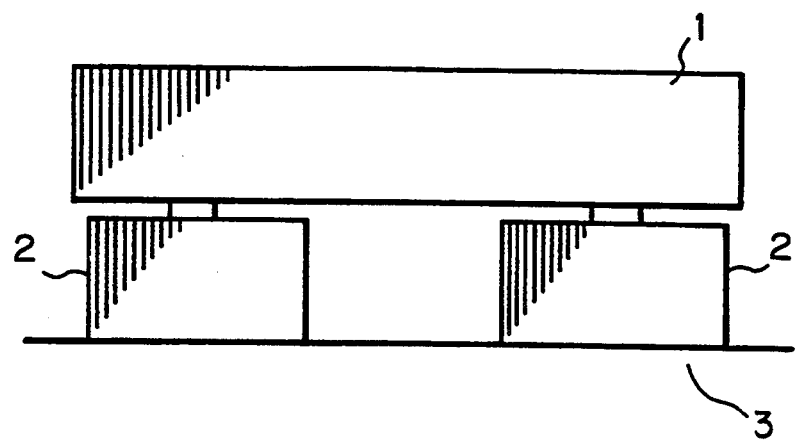

FIG. 1(a) is a plan view of an embodiment of a vibration eliminating apparatus according to the present invention and FIG. 1(b) is a side elevation thereof. A floor board 1 is suspended by four actuators 2 comprising electromagnets and mounted on an installation floor 3 to support the floor board 1 at four points as shown in FIG. 1(a). On the floor board 1 is mounted a machine such as an electron microscope and a semiconductor manufacturing apparatus, which should be stably supported.

Figure 2A:
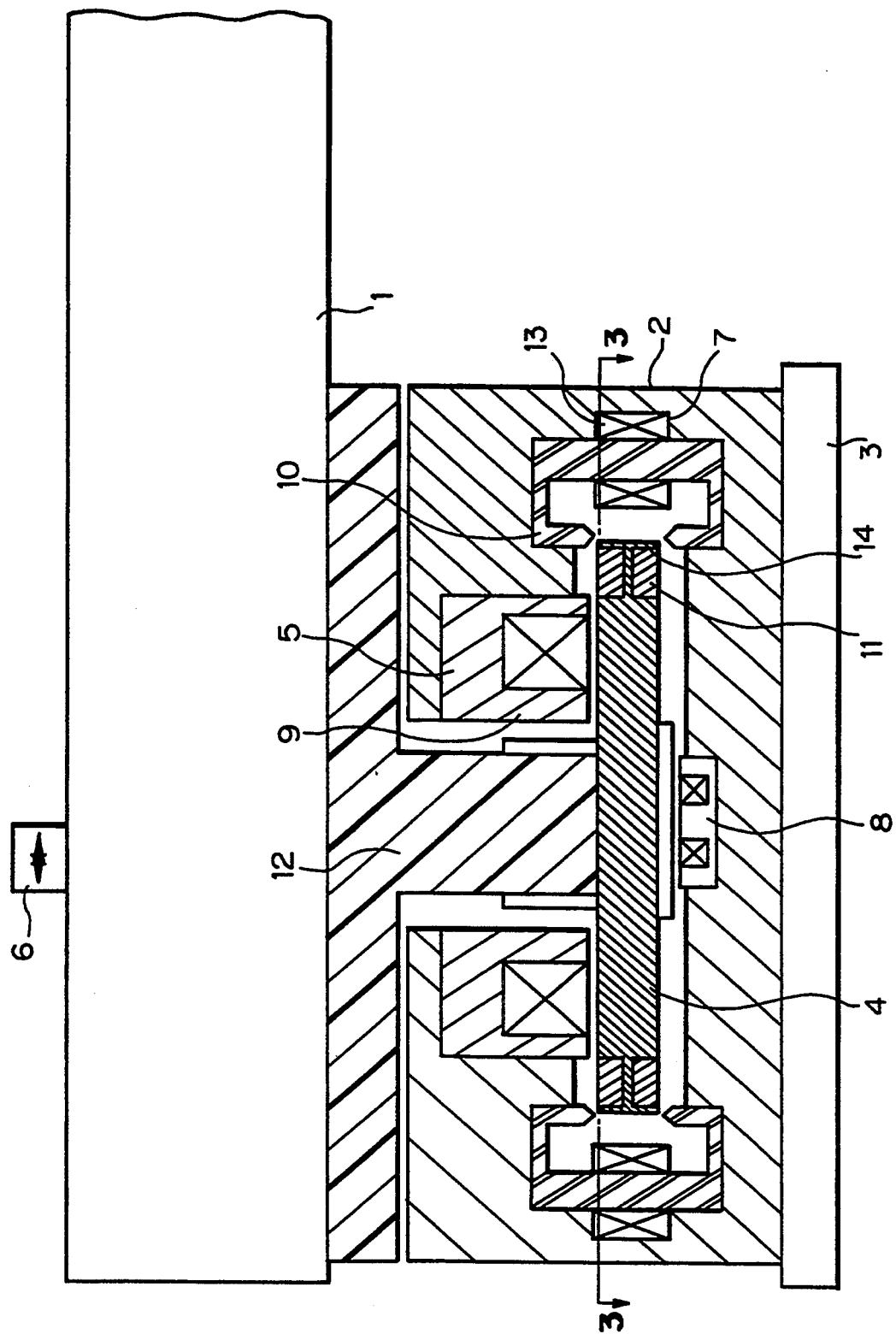
FIG. 2(a) is a schematic diagram of the structure of an actuator of the vibration eliminating apparatus shown in FIGS. 1(a) and 1(b)

FIG. 2(a) illustrates the structure of an actuator of the vibration eliminating apparatus shown in FIGS. 1(a) and 1(b). The floor board 1 is fixed to a magnetic disk 4 through a supporting member 12. The magnetic disk 4 is formed by a magnetic material having a high permeability. A supporting electromagnet 5 is fixedly mounted on the installation floor 3. The electromagnet 5 comprises a circular yoke 9 around which a coil is wound. The yoke 9 is provided facing the magnetic disk 4. Specifically, the yoke 9 and magnetic disk 4 form a magnetic circuit for the supporting electromagnet 5 through a gap between the yoke 9 and disk 4. A displacement sensor 8 detects a displacement of the magnetic disk 4 and the floor board 1 relative to the installation floor 3, with a target being provided on the magnetic disk 4.

Figure 3:
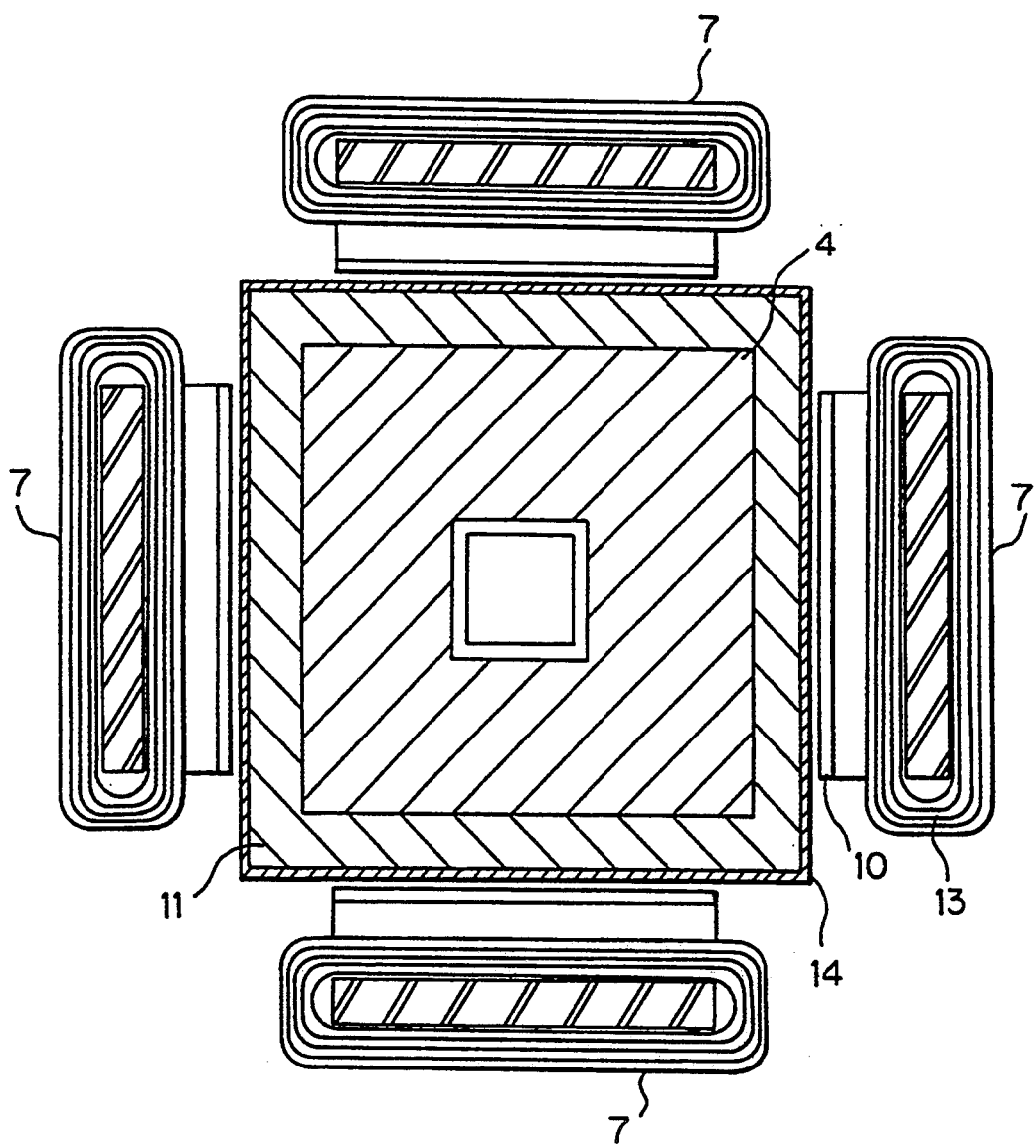
FIG. 3 is a plan view of the actuator shown in FIG. 2(a)

A thin magnetic pole 14 is formed around the magnetic disk 4 through a non-magnetic material portion 11. Control electromagnets 7, each having a yoke 10, are arranged in the proximity to both ends of the thin magnetic pole 14 with a minute deviation therefrom. Each of the yokes 10 has tapered end portions and forms a magnetic circuit with the thin magnetic pole 14 through a gap therebetween. FIG. 3 illustrates a plan view of the actuator 2 of the vibration eliminating apparatus shown in FIGS. 1(a) and 1(b). When each control electromagnet 7, disposed at one side of the magnetic disk 4, is excited by a corresponding coil 13, a magnetic circuit is formed from the yoke 10, having the tapered end portions, through the gap, the thin magnetic pole 14 being deviated a minute distance and in proximity to the yoke 10 and the gap with the yoke 10, thereby producing a magnetic flux. Since the yoke 10 has the tapered end portions and the magnetic pole 14 is thin, the produced magnetic flux concentrates within a narrow area, and an extensive magnetic shearing force is generated, even when the magnetic flux has a small amplitude. The thin magnetic pole 14 is surrounded by the yokes 10 of the control electromagnets 7 having the tapered ends and is deviated a minute distance therefrom in proximity thereto. Therefore, when the control electromagnets 7 are excited, the thin magnetic pole 14 receives horizontal forces by the magnetic shearing forces generated by the yokes 10. Namely, when the control electromagnet 7 disposed at the right side of FIG. 3 is excited, the magnetic material disk 4 receives a horizontal force to the right, which force is proportional to the level of the exciting current. As explained above, the control electromagnets 7 which are disposed in the proximity to the thin magnetic pole 14 surrounding the magnetic disk 4 can apply a force to the magnetic disk 4 in a desired direction in the horizontal plane.

Next, the operation of the vibration eliminating apparatus will be described. In FIG. 2, when an exciting current flows through the coil of the supporting electromagnet 5, a magnetic circuit is formed through the gap between the yoke 9 of the supporting electromagnet 5 and the magnetic disk 4, thereby generating a magnetic flux. A magnetic attracting force exerted by this magnetic flux serves to suspend the magnetic disk 4. The magnetic disk 4, and therefore the floor board 1, are suspended and held from the installation floor 3 at a position where the force of gravity of the floor board 1 and a machine mounted thereon and a magnetic attracting force exerted by the four electromagnets 5 are balanced. Namely, since the electromagnets 5 are fixedly mounted on the installation floor 3, the floor board 1 on which a machine is mounted is suspended from the installation floor 3. The supporting electromagnets 5 merely support the floor board 1 with forces in the vertical direction. With regard to the horizontal direction, the magnetic disk 4 is supported by the magnetic shearing forces generated between the yokes 9 of the supporting electromagnets 5 and the magnetic disk 4 and between the control electromagnets 7 and the thin magnetic pole 14.

The floor board 1 is provided with an acceleration sensor 6 for controlling the floor board 1 in the horizontal direction in accordance with acceleration in the horizontal direction. The acceleration sensor 6 detects acceleration of the floor board 1 in the horizontal direction and excites the control electromagnets 7 so that a magnetic attracting force may be exerted in the horizontal direction to the thin magnetic pole 14 of the magnetic disk 4 to cancel the vibration of the floor board 1. The thin magnetic pole 14 is coupled to the magnetic disk 4 through the non-magnetic material portion 11 and the end portions of each of the yokes 10 of the control electromagnets 7 are tapered, enabling intensive magnetic attracting forces to be exerted even when a vibration has a very small amplitude.

In the above embodiment, a machine is mounted on the floor board 1 and the floor board 1 is suspended by the actuators 2 from the installation floor 3. However, it is possible that a machine is mounted on the floor 3. In this case, the floor 3 is considered to be suspended by the actuators 2 from the floor 1. It is noted that the present invention includes both the case where the floor 1 on which a machine is mounted is suspended from floor 3 and the case where the floor 3 on which a machine is mounted is suspended from floor 1.

Figure 4:
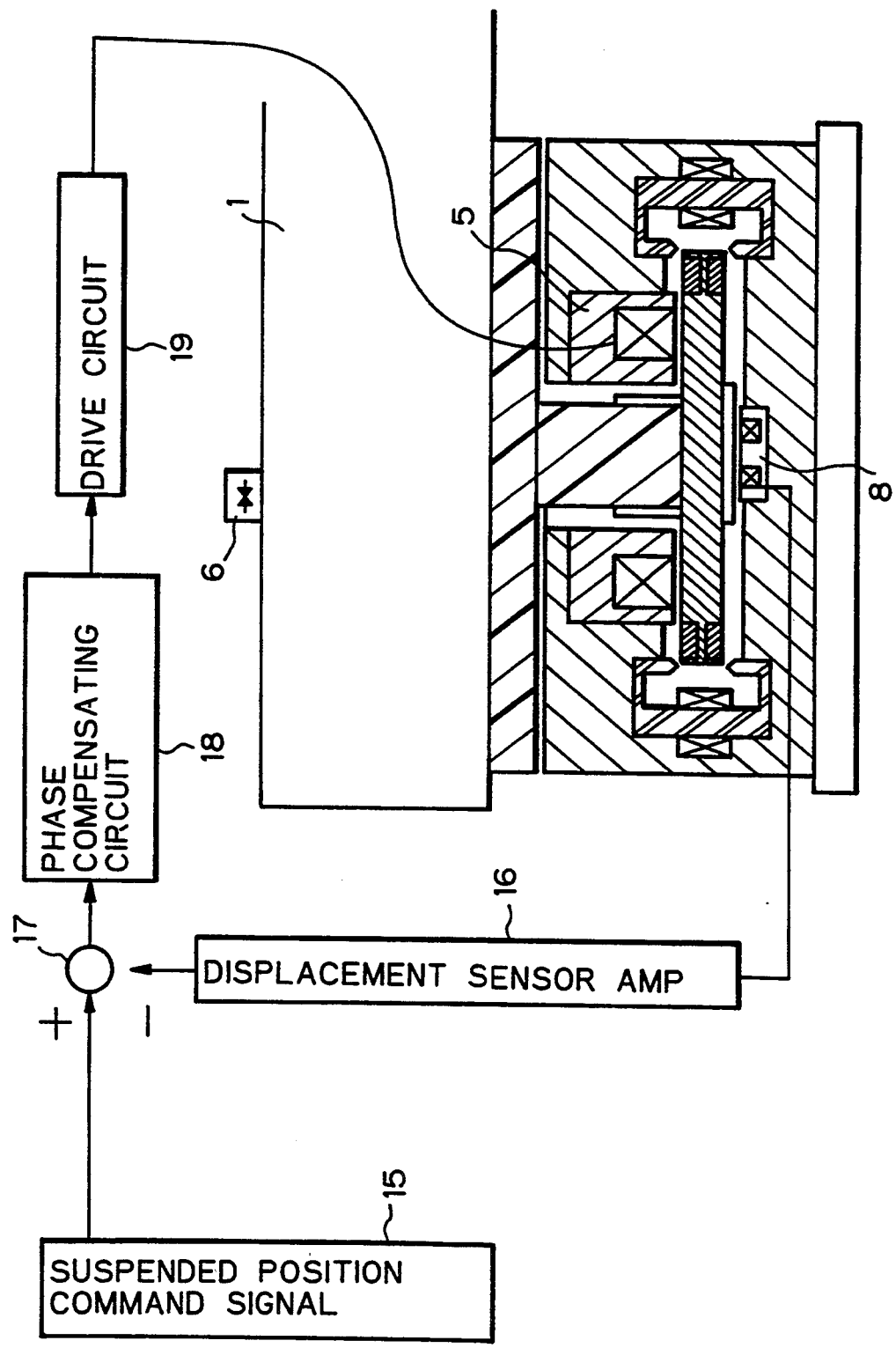
FIG. 4 is a block diagram for controlling the vibration eliminating apparatus shown in FIGS. 1(a) and 1(b) in the vertical direction.

FIG. 4 is a block diagram of a circuit for controlling, in the vertical direction, the vibration eliminating apparatus shown in FIGS. 1(a) and 1(b), 2 and 3. A desired position of the suspended magnetic disk 4 in the vertical direction is designated by a suspended position command signal 15. A comparator 17 compares a suspended position command signal 15 with a signal obtained by amplifying a signal of the displacement sensor 8 by a displacement sensor amplifier 16. If the output of the displacement sensor amplifier 16 does not reach the suspended position command signal 15, the difference therebetween is adjusted in phase by a phase compensating circuit 18, power-amplified by a drive circuit 19 and applied to the coil of the supporting electromagnet 5 as an exciting current. When an exciting current flows through the supporting electromagnet 5, a magnetic attracting force generated is exerted on the magnetic disk 4, thereby suspending the magnetic disk 4. Such a feedback control system explained above causes the magnetic disk 4 to be suspended up to the position designated by the suspended position command signal 15.

Figure 5:
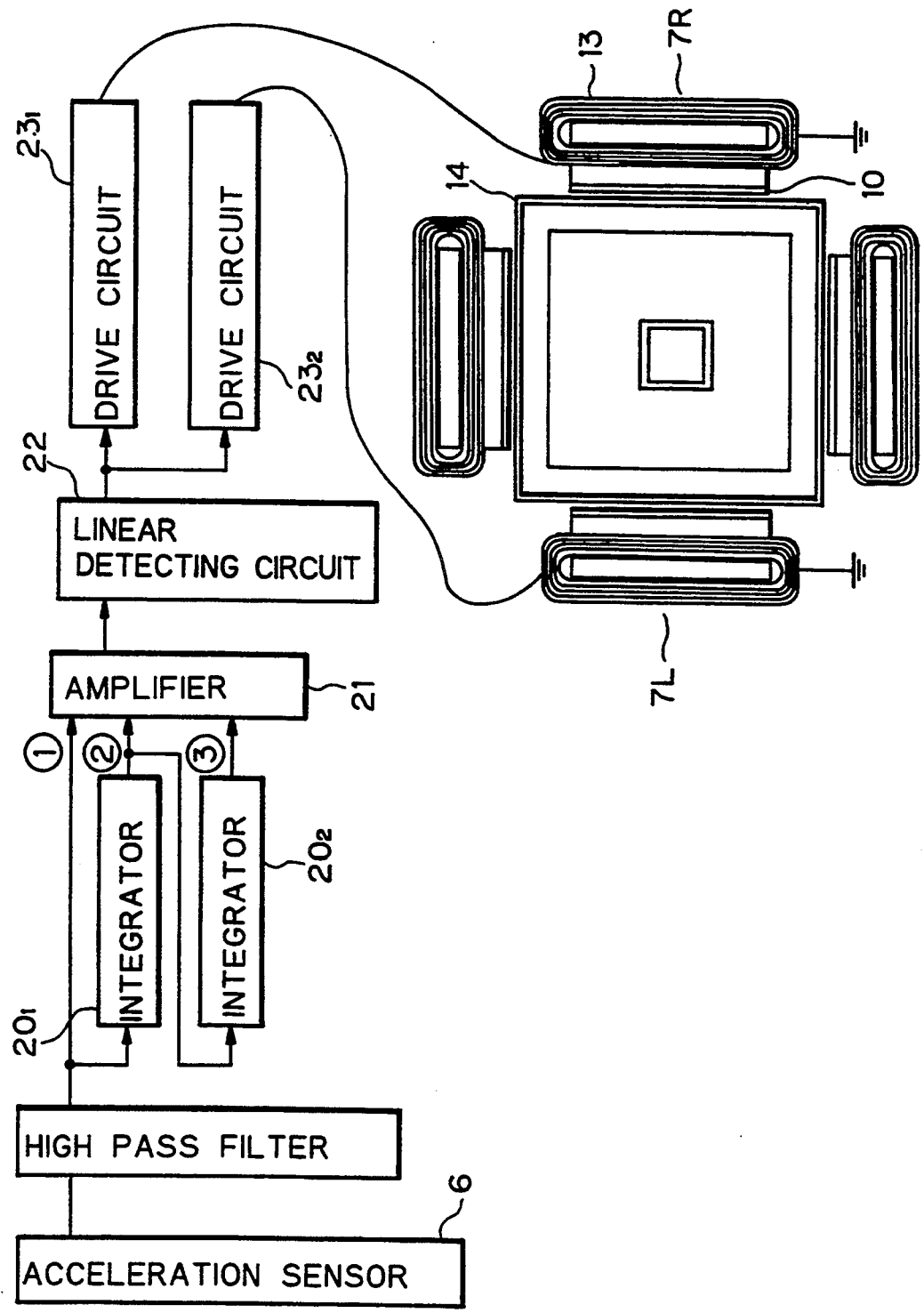
FIG. 5 is a block diagram for controlling the vibration eliminating apparatus shown in FIGS. 1(a) and 1(b) in the horizontal direction.

FIG. 5 is a block diagram of a circuit for controlling, in the horizontal direction, the vibration eliminating apparatus shown in FIGS. 1(a) and 1(b), 2 and 3. The acceleration sensor 6 mounted on the floor board 1 detects acceleration applied to the floor board in the horizontal direction. The detected acceleration signal is ① directly input to an amplifying circuit 21, ② converted to velocity information by integrating the acceleration signal once by an integral circuit $20_1$ and then input to the amplifying circuit 21, or ③ converted to displacement information by integrating the acceleration signal twice by integral circuits $20_1$ and $20_2$ and then input to the amplifying circuit 21. After being amplified by the amplifier circuit 21, having a constant gain, the acceleration signal is separated into positive and negative components by a linear detecting circuit 22. These components are respectively power-amplified by drive circuits $23_1$ and $23_2$ and applied to the coils 13 of the control electromagnets 7R and 7L disposed at the right and left sides.

① A virtual total weight of the floor board 1 increases and a natural vibration value decreases by exciting the control electromagnets 7 with the acceleration information.

② A peak value of the natural vibration can be lowered by exciting the control electromagnets 7 by velocity information obtained by a single integration of the acceleration signal.

③ Spring rigidity from a virtual supporting point may increase and a level of the natural vibration system can be lowered by exciting the control electromagnets 7 with displacement information obtained by double integration of the acceleration information.

Therefore, as a whole, horizontal vibration produced by the floor board 1 can be cancelled and vibration eliminating control for lowering the peak of the natural vibration value can also be achieved by exciting the control electromagnets 7 based on acceleration in the horizontal direction of the acceleration sensor 6 mounted on the floor board 1.

Moreover, the acceleration sensor 6 provided on the floor board 1 to detect acceleration in the horizontal direction can control exciting currents flowing through the supporting electromagnets. Such control enables elimination of vibration in the horizontal and vertical directions of the absolute coordinates system.

As explained above in detail, an embodiment of a vibration eliminating apparatus of the present invention can suspend a magnetic disk fixedly mounted to a floor board by magnetic forces exerted by electromagnets fixed to an installation floor. A thin magnetic pole is provided around the magnetic disk through a non-magnetic material portion and control electromagnets having yokes located in the vicinity of the magnetic pole are also provided. Therefore, every vibration of the installation floor, from small to large amplitudes, can be eliminated by detecting horizontal acceleration of the floor board and exciting the control electromagnets to cancel forces exerted on the floor board. Particularly since the peripheral portion of the magnetic disk is provided with the thin magnetic pole through the non-magnetic material portion and the yokes of the control electromagnets have tapered end portions, vibration of very small amplitudes can be eliminated.

Next, another embodiment of a vibration eliminating apparatus of the present invention will be explained.

Figure 6:
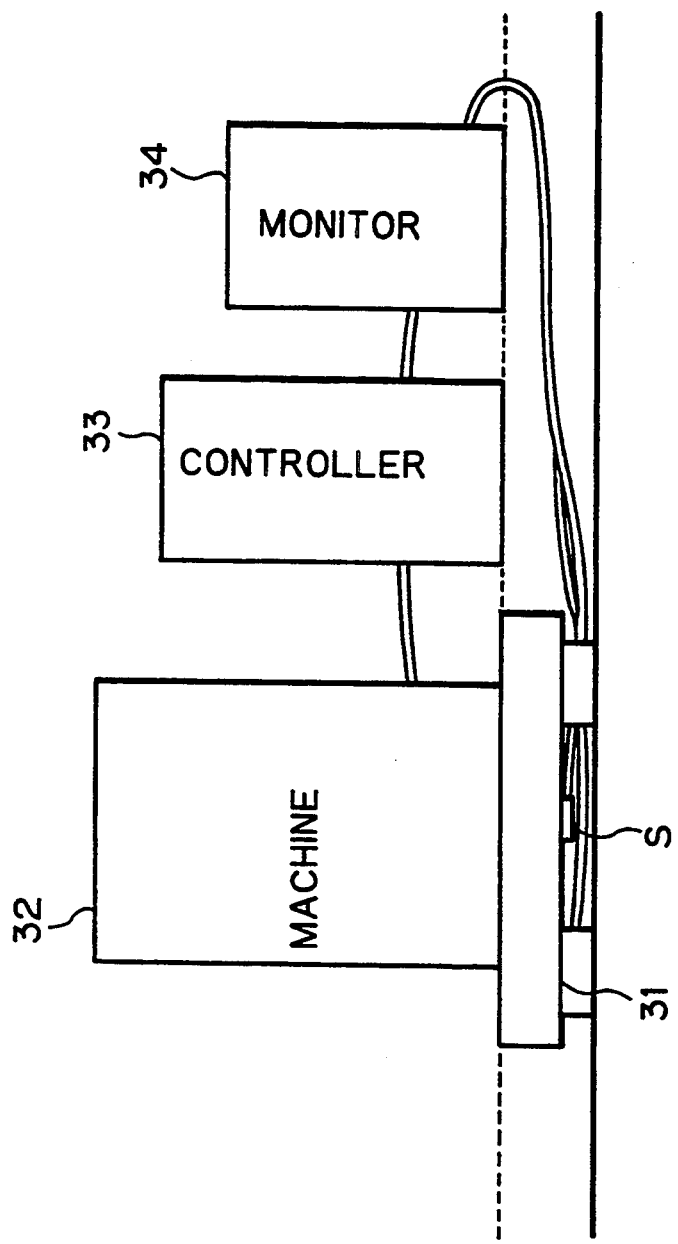
FIG. 6 is a schematic diagram of the structure of another embodiment of a vibration eliminating apparatus according to the present invention.

In FIG. 6, a machine 32 such as a semiconductor manufacturing apparatus and an electron microscope is mounted on a vibration eliminating board 31 and the machine 32 is connected with a machine controller 33. The vibration eliminating board 31 includes a vibration detector S.

Figure 7:
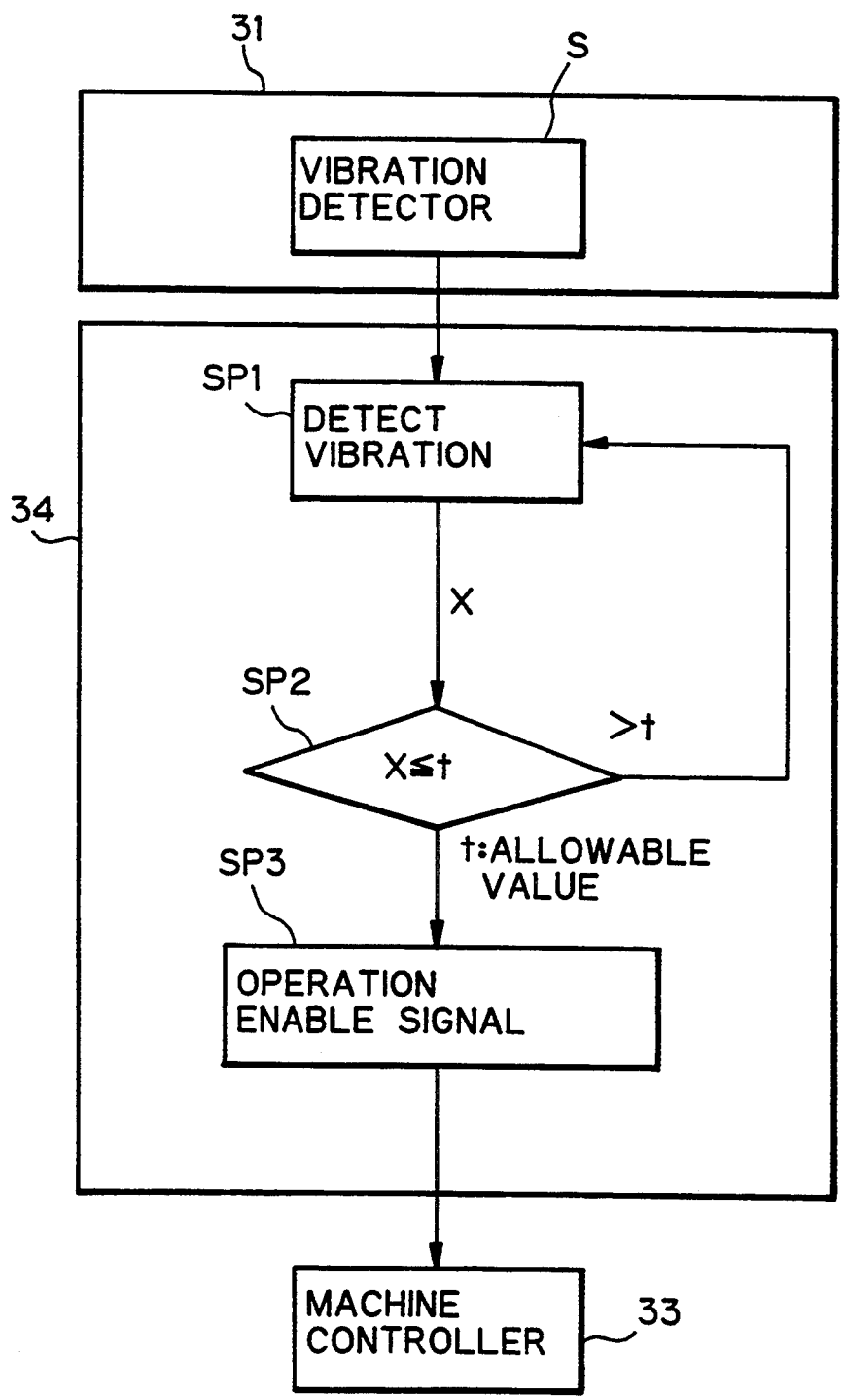
FIG. 7 is a flowchart for explaining a vibration monitoring operation performed by the vibration eliminating apparatus illustrated in FIG. 6.

A vibration monitor 34 is provided adjacent to the machine 32 and vibration eliminating board 31. Vibration of the vibration eliminating board 31 detected by the vibration detector S is monitored by the vibration monitor 34 (provided in a controller in the case of an active vibration eliminating board) at any time. The vibration monitor 34 is connected with the machine controller Operation of the vibration eliminating apparatus having the structure shown in FIG. 6 will be described with reference to FIG. 7, showing a vibration monitoring flowchart.

Vibration of the vibration eliminating board 31 is detected by the vibration detector S mounted on the vibration eliminating board 31, and the detected signal is sent to the vibration monitor 34 (step SP1). Whether vibration X is within an allowable range of the machine 32 or not is decided (step SP2). If the vibration X is within the allowable range, an operation enable signal is sent to the machine controller 33 (step SP3). The machine 32 is operated only when such an operation enable signal is received. If vibration exceeds the allowable range, the operation enable signal is not received and the machine 32 stops operation. Therefore, the machine 32 operates depending on the existence of an operation enable signal and thus can operate under the condition that vibration of the vibration eliminating board 31 is within an allowable range.

As explained above, according to the second embodiment of a vibration eliminating apparatus of the present invention, a machine mounted on a vibration eliminating board operates depending on the existence of an operation enable signal issued from a vibration monitor and thus can operate under the environment that vibration of the vibration eliminating board is within an allowable range. As a result, it is possible to avoid such a condition that adverse influence is exerted on the yield of products and the accuracy in measurement and observation.

What is claimed is:

1. An apparatus, comprising:
    a first floor;
    a magnetic member fixed to said first floor;
    a second floor;
    electromagnetic means for suspending said magnetic member, said electromagnetic means comprising a supporting electromagnet fixed to said second floor, and said magnetic member being suspended by force provided only through said supporting electromagnet;

a magnetic pole disposed around said magnetic member, said magnetic pole and said magnetic member having a non-magnetic member therebetween; and a control electromagnet having a yoke located in proximity to said magnetic member.

2. The apparatus of claim 1, wherein a machine is mounted on said first floor.

3. The apparatus of claim 2, and further comprising an acceleration sensor on said first floor and control means for controlling said control electromagnet in response to output of said acceleration sensor so as to exert a magnetic attracting force on said magnetic pole which cancels vibration detected by said acceleration sensor.

4. The apparatus of claim 1, wherein a machine is mounted on said second floor.

5. The apparatus of claim 4, and further comprising an acceleration sensor on said second floor and control means for controlling said control electromagnet in response to output of said acceleration sensor so as to exert a magnetic attracting force on said magnetic pole which cancels vibration detected by said acceleration sensor.

6. The apparatus of claim 1, wherein said yoke of said control electromagnet has a tapered end portion located in proximity to said magnetic pole.

7. The apparatus of claim 1, wherein said control electromagnet is fixed relative to said second floor.

8. The apparatus of claim 7, wherein said magnetic pole is a thin member extending in the vertical direction about the periphery of said magnetic member, and said yoke of said control electromagnet has tapered end portions located in proximity to opposite vertical ends of said thin member.

9. The apparatus of claim 1, and further comprising a displacement sensor for detecting displacement of said magnetic member in the vertical direction and providing an output signal in response thereto, and control means for comparing said output signal to a suspended position command signal and controlling said supporting electromagnet in response to the comparison.

10. An apparatus, comprising:

a first floor;

a magnetic member fixed to said first floor;

a second floor;

a supporting electromagnet fixed to said second floor for suspending said magnetic member with a magnetic force;

a magnetic pole disposed around said magnetic member, said magnetic pole and said magnetic member having a non-magnetic member therebetween, and said magnetic pole having ends; and a control electromagnet having a yoke located in proximity to said magnetic member, said yoke having tapered ends that face each other and are located in proximity to respective corresponding ones of said ends of said magnetic pole for directing said ends of said magnetic pole.

* * * * *